United States Patent [19]

Ashby

[11] 3,904,689

[45] Sept. 9, 1975

[54] ALKANOLAMINE DERIVATIVES

[75] Inventor: Ernest John Ashby, Macclesfield, England

[73] Assignee: Imperial Chemical Industries Limited, London, England

[22] Filed: May 8, 1973

[21] Appl. No.: 358,349

[30] Foreign Application Priority Data
June 1, 1972 United Kingdom............... 25709/72

[52] U.S. Cl...... 260/566 A; 260/2.1 E; 260/501.17; 260/566 AE; 424/316; 424/327
[51] Int. Cl........................................... C07c 131/00
[58] Field of Search....... 260/566 A, 566 AE, 2.1 E, 260/501.17

[56] References Cited
UNITED STATES PATENTS
3,732,277  5/1973  Koppe et al. ............... 260/566 A X FOREIGN PATENTS OR APPLICATIONS
1,231,783  5/1971  United Kingdom............. 260/566 A Primary Examiner—Gerald A. Schwartz
Attorney, Agent, or Firm—Cushman, Darby & Cushman

[57] ABSTRACT

1-o-oximinomethylphenoxy-3-amino-2-propanol derivatives, processes for their manufacture, pharmaceutical compositions containing them and a method of using them in the treatment of heart disease. The compounds possess $\beta$-adrenergic blocking activity. Representative of the compounds disclosed is o-(2-hydroxy-3-t-butylaminopropoxy)-benzaldehyde oxime.

5 Claims, No Drawings

ALKANOLAMINE DERIVATIVES

This invention relates to improved alkanolamine derivatives which possess β-adrenergic blocking activity.

In United Kingdom No. 1,231,783 there is a general description of a large number of alkanolamine derivatives including compounds of the formula:

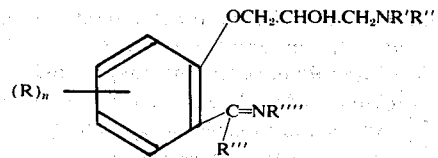

wherein R' may be, inter alia, the hydrogen atom; R'' may be, inter alia, an alkyl group, for example the isopropyl or t-butyl group; R''' may be, inter alia, the hydrogen atom or an alkyl or aryl group; R'''' may be, inter alia, a group of the formula —OR''''', wherein R''''' represents the hydrogen atom or an alkyl, aryl or aralkyl group; R may be a halogen atom or may have various other values and $n$ may be zero or an integer from 1 to 4 inclusive, and their acid-addition salts. The compounds are stated to antagonise some effects of adrenaline, noradrenaline and sympathetic stimulation on cardiac muscle and show antiarrythmic properties.

There is no specific example in said specification of any compound in which the substituent R''' is the hydrogen atom. The majority of compounds specifically exemplified have for R''' the methyl group, although some have a hydrocarbon substituent R''' which contains more than one carbon atom.

We have now found, and herein lies our invention, that certain compounds of the type described above wherein R''' stands for hydrogen are much more active as β-adrenergic blocking agents (that is, agents which antagonise certain effects of catecholamines such as adrenaline) than are the corresponding compounds, described in the said specification, wherein R''' stands for the methyl group. Furthermore, these novel compounds wherein R''' stands for hydrogen, unlike the corresponding compounds wherein R''' stands for the methyl radical, possess cardio-selective β-adrenergic blocking activity as hereinafter defined.

According to the invention there is provided a novel alkanolamine derivative of the formula:

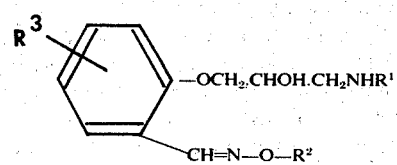

wherein $R^1$ stands for an alkyl, hydroxyalkyl or cycloalkyl radical each of up to 6 carbon atoms, wherein $R^2$ stands for hydrogen or for an alkyl radical of up to 6 carbon atoms and wherein $R^3$ stands for hydrogen or for a halogen atom, or an acid-addition salt thereof.

It is to be understood that, in addition to possible syn- and anti-isomerism at the oximino group, the alkanolamine derivative of the invention possesses an asymmetric carbon atom, namely the carbon atom of the —CHOH— group in the alkanolamine side-chain, and it may therefore be resolved into optically-active enantiomorphic forms. At least one, and possibly both, of these enantiomorphic forms will possess β-adrenergic blocking activity. It is to be understood, therefore, that this invention encompasses the racemic form of the alkanolamine derivative and any enantiomorphic form which possesses β-adrenergic blocking activity. It is to be understood that β-adrenergic blocking activity usually predominates in that enantiomorphic form which has the "S" absolute configuration of the said —CHOH— group.

Preferably the alkyl or hydroxyalkyl radical $R^1$ contains 3 or 4 carbon atoms and is branched at the α-carbon atom. $R^1$ may be, for example, the isopropyl, s-butyl, t-butyl, 2-hydroxy-1-methylethyl, 2-hydroxy-1,1-dimethylethyl, cyclopropyl, cyclobutyl, cyclopentyl or cyclohexyl radical.

A suitable value for $R^2$ when it stands for an alkyl radical is, for example, the methyl, ethyl or n-propyl radical.

A suitable value for $R^3$ when it stands for a halogen atom is, for example, the fluorine, chlorine, bromine or iodine atom. The halogen atom $R^3$, if present, is preferably in the 4-position of the benzene ring with respect to the alkanolamine side-chain.

A suitable acid-addition salt of an alkanolamine derivative of the invention, is, for example, a salt derived from an inorganic acid, for example a hydrochloride, hydrobromide, phosphate or sulphate, or a salt derived from an organic acid, for example an oxalate, lactate, tartrate, acetate, salicylate, citrate, benzoate, β-naphthoate, adipate or 1,1-methylene-bis-(2-hydroxy-3-naphthoate), or a salt derived from an acidic synthetic resin, for example a sulphonated polystyrene resin, for example "Zeo-Karb" 225 (Zeo-Karb is a Trade Mark).

A specific alkanolamine derivative of the invention is, for example, o-(2-hydroxy-3-isopropylaminopropoxy)-benzaldehyde oxime or o-(2-hydroxy-3-t-butylaminopropoxy)-benzaldehyde oxime or an acid-addition salt thereof.

The alkanolamine derivative of the invention may be manufactured by any chemical process known to be useful for the manufacture of chemically-analogous compounds.

According to a further feature of the invention there is provided a process for the manufacture of the alkanolamine derivative of the invention which comprises assembling in sequence, by chemical synthesis, the five radicals:

i. an oximino radical of the formula:

wherein $R^4$ either stands for a protecting group or has the meaning stated above for $R^2$;

ii. a phenoxy radical of the formula:

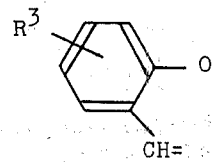

wherein $R^3$ has the meaning stated above;

iii. an oxygenated three carbon radical of the formula:

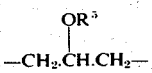

wherein $R^5$ stands for hydrogen or for a protecting group;

iv. an imino radical of the formula —$NR^6$—, wherein $R^6$ stands for hydrogen or for a protecting group; and v. a radical of the formula —$R^1$, wherein $R^1$ has the meaning stated above;

whereafter if one or more of $R^4$, $R^5$ and $R^6$ stands for a protecting group, the one or more protecting groups are removed.

The various stages of the assembly may be carried out in any possible order. Thus, for example:

a. a phenol of the formula:

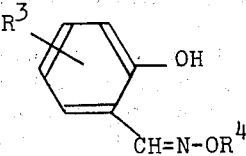

wherein $R^3$ and $R^4$ have the meanings stated above, may first be reacted with an oxygenated three-carbon derivative, for example a compound of the formula:

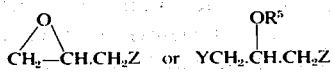

wherein $R^5$ has the meaning stated above, wherein Y stands for a displaceable radical and wherein Z stands for the hydroxy radical or for a displaceable radical. If Z stands for the hydroxy radical, the intermediate compound obtained is further reacted with a reagent which will replace the primary hydroxy radical Z with a displaceable radical Y. The resulting product, which is a compound of the formula:

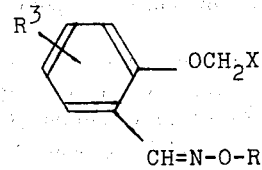

wherein $R^3$ and $R^4$ have the meanings stated above and wherein X stands for the group

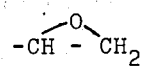

or the group

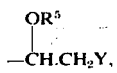

wherein $R^5$ and Y have the meanings stated above, or which may be, when $R^5$ stands for hydrogen, a mixture of such compounds wherein X has both meanings stated above, is then reacted with an amine of the formula $R^1R^6NH$, wherein $R^1$ and $R^6$ have the meanings stated above, or with a precursor of such an amine.

b. An oxygenated three-carbon derivative, for example a compound of the formula:

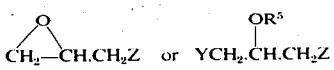

wherein $R^5$, Y and Z have the meanings stated above, is reacted with an amine of the formula $R^1R^6NH$, wherein $R^1$ and $R^6$ have the meanings stated above, or with a precursor of such an amine. If Z stands for the hydroxy radical the intermediate compound obtained is further reacted with a reagent which will replace the primary hydroxy radical Z with a displaceable radical Y. The resulting product, which is a compound of the formula $XCH_2.NR^1R^6$, wherein $R^1$, $R^6$ and X have the meanings stated above, or which may be, when $R^5$ stands for hydrogen, a mixture of such compounds wherein X has both meanings stated above, is then reacted with a phenol of the formula:

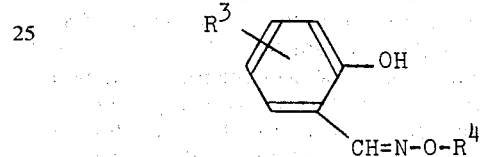

wherein $R^3$ and $R^4$ have the meanings stated above.

A suitable value for Y, or for Z when it stands for a displaceable radical, is, for example, a halogen atom, for example, the chlorine or bromine atom, or a sulphonyloxy radical, for example an alkanesulphonyloxy radical of up to 6 carbon atoms or an arenesulphonyloxy radical of up to 10 carbon atoms, for example the methanesulphonyloxy, benzene-sulphonyloxy or toluene-p-sulphonyloxy radical.

A suitable reagent which will replace the primary hydroxy radical Z with a displaceable radical Y is, for example, a halogenating agent, for example a thionyl halide, for example thionyl chloride or thionyl bromide, or a sulphonylating agent, for example an alkanesulphonyl halide or an arenesulphonyl halide, for example methanesulphonyl chloride, benzenesulphonyl chloride or toluene-p-sulphonyl chloride.

The reaction involving a phenol reactant may be carried out in the presence of an acid-binding agent, for example an alkali metal hydroxide, for example sodium hydroxide, or an organic base, for example piperidine. Alternatively, an alkali metal derivative of the phenol reactant, for example the sodium or potassium derivative, may be used as starting material. The reaction may be carried out in a diluent or solvent, for example methanol or ethanol, and it may be accelerated or completed by the application of heat, for example by heating to the boiling point of the diluent or solvent.

The reaction involving an amine of the formula $R^1R^6NH$ may be carried out at ambient temperature or it may be accelerated or completed by the application of heat, for example by heating to a temperature of 90°–110°C.; it may be carried out at atmospheric or at an elevated pressure, for example by heating in a sealed vessel; and it may be carried out in an inert diluent or solvent, for example methanol or ethanol, or an excess of the amine of the formula $R^1R^6NH$, wherein $R^1$ and $R^6$ have the meanings stated above, may be used as diluent or solvent.

A suitable precursor of the amine of the formula $R^1R^6NH$, is, for example, a urea of the formula $R^1R^6N.CO.NR^1R^6$, wherein $R^1$ and $R^6$ have the meanings stated above. The reaction involving a urea may be carried out in a high boiling diluent or solvent, for example tetralin, decalin or benzonitrile, and it may be carried out at a temperature of between 150° and 220°C.

c. The series of reactions described under (a) or (b) above may be carried out except that a phenol of the formula:

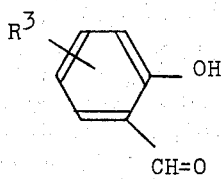

wherein $R^3$ has the meaning stated above is used in place of the phenol of the formula:

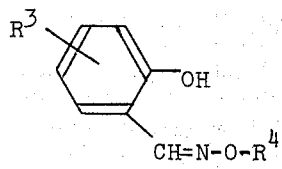

If, as is usually the case when $R^6$ stands for hydrogen, the amine of the formula $R^1NH_2$ condenses with the formyl group to form a Schiff base, said Schiff base is converted to the corresponding aldehyde by acid hydrolysis. The resulting product, which is an aldehyde of the formula:

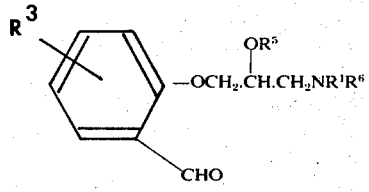

wherein $R^1$, $R^3$, $R^5$ and $R^6$ have the meanings stated above, is then reacted with a hydroxylamine derivative of the formula:

$$H_2N—O—R^4$$

wherein $R^4$ has the meaning stated above.

The reaction involving a hydroxylamine may be carried out in a diluent or solvent, for example ethanol, and it may be accelerated or completed by the application of heat, for example by heating to the boiling point of the diluent or solvent. The reaction is conveniently carried out under basic conditions, for example in the presence of an alkali metal hydroxide, for example sodium hydroxide.

d. The series of reactions described under (a) or (b) or (c) above may be carried out except that an amine of the formula $R^6NH_2$ is used in place of an amine of the formula $R^1R^6NH$, it being understood that when $R^6$ stands for hydrogen the amine is ammonia. The radical $R^1$ may then be inserted as a separate step, for example either by the reaction of the final product from the series of reactions described under (a) or (b) or (c) above with a compound of the formula $R^1Y$, wherein $R^1$ and $Y$ have the meanings stated above, or, when $R^6$ stands for hydrogen, by the reaction under reducing conditions of the final product from the series of reactions described under (a) or (b) or (c) above with a carbonyl compound of the formula $R^7.CO.R^8$, wherein $R^7$ stands for an alkyl radical and $R^8$ stands for an alkyl or hydroxyalkyl radical, or wherein $R^7$ and $R^8$ are joined together with the adjacent carbon atom to form a cycloalkyl radical, such that the radical $—CHR^7R^8$ has the same meaning as is stated above for $R^1$.

A particularly suitable compound of the formula $R^1Y$ is isopropyl bromide. The reaction involving a compound of the formula $R^1Y$ may conveniently be carried out in the presence of a base, for example sodium or potassium carbonate, in a diluent or solvent, for example ethanol or isopropanol, at an elevated temperature, for example at the boiling point of the diluent or solvent.

A particularly suitable compound of the formula $R^7.CO.R^8$ is acetone. Suitable reducing conditions for the reaction involving the carbonyl compound are those provided by the presence of an alkali metal borohydride, for example sodium borohydride or lithium cyanoborohydride, in an inert diluent or solvent, for example in one or more solvents selected from water, ethanol, methanol and an excess of the carbonyl compound used as starting material. It is to be understood that reducing conditions must be chosen such that the oximinomethyl group ($—CH=N—O—$) is not affected thereby.

e. A compound wherein one or more of $R^4$, $R^5$ and $R^6$ stands for a protecting group may be prepared by the series of reactions described under (a) or (b) or (c) or (d) above. Alternatively, a suitable protecting group may be introduced by conventional means into an intermediate compound at any stage preceding the final stage.

A suitable value for $R^5$ when it stands for a protecting group is, for example, an acyl radical, for example an alkanoyl radical of up to 20 carbon atoms or an aroyl radical of up to 10 carbon atoms, or an α-alkoxyalkyl radical (that is, a radical which forms with the oxygenated three-carbon radical an acetal radical), for example the tetrahydropyranyl radical.

A suitable value for $R^6$ when it stands for a protecting group is, for example, an acyl radical as defined for $R^5$, or a carbamoyl radical, for example a radical of the formula $—CONHR^1$, wherein $R^1$ has the meaning stated above.

Alternatively, $R^5$ and $R^6$ may be joined together so that one protecting group serves to protect both the oxygen and nitrogen atoms. Such a protecting group may be, for example, the carbonyl ($—CO—$) radical, such that it forms, together with the adjacent oxygen and nitrogen atoms and two carbon atoms of the three-carbon radical, an oxazolidinone nucleus, or it may be a radical of the formula $—CHR^9—$, wherein $R^9$ stands for hydrogen, or for an alkyl radical of up to 4 carbon atoms or an aryl radical of up to 10 carbon atoms, such that it forms, together with the adjacent oxygen and nitrogen atoms and two carbon atoms of the three-carbon radical, an oxazolidine nucleus.

The acyl protecting group $R^5$ or $R^6$, or the carbamoyl protecting group $R^6$, or the carbonyl protecting group formed by $R^5$ and $R^6$ taken together, may be removed by hydrolysis in the presence of a base, for example an alkali metal hydroxide, in a diluent or solvent, for example water, methanol, ethanol or a mixture thereof.

The α-alkoxyalkyl protecting group $R^5$ or $R^6$, or the protecting group $R^5CH$— formed by $R^5$ and $R^6$ taken together, may be removed by hydrolysis in the presence of an acid, for example a mineral acid, for example aqueous hydrochloric acid, and the hydrolysis may be carried out at a temperature of up to 100°C.

One preferred process for the manufacture of the alkanolamine derivative of the invention comprises the reaction of a compound of the formula:

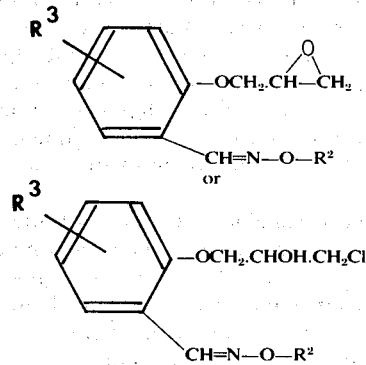

wherein $R^2$ and $R^3$ have the meanings stated above (both of which compounds may be obtained by the reaction of the corresponding phenol with epichlorohydrin), with an amine of the formula $R^1NH_2$, wherein $R^1$ has the meaning stated above.

A second, and more particularly, preferred process for the manufacture of the alkanolamine derivative of the invention comprises the reaction of a compound of the formula:

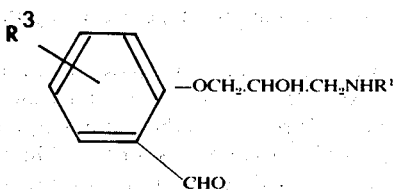

wherein $R^1$ and $R^3$ have the meanings stated above, with a hydroxylamine derivative of the formula:

$$H_2N—OR^2$$

wherein $R^2$ has the meaning stated above.

Optically-active enantiomorphs of the alkanolamine derivative of the invention may be obtained by the resolution by conventional means of the corresponding racemic alkanolamine derivative of the invention.

The said resolution may be carried out by reacting the racemic alkanolamine derivative with an optically-active acid, followed by fractional cyrstallisation of the diastereoisomeric mixture of salts thus obtained from a diluent or solvent, for example ethanol, whereafter the optically-active alkanolamine derivative is liberated from the salt by treatment with a base. A suitable optically-active acid is, for example, (+)- or (−)-O,O-di-p-toluoyl-tartaric acid.

The resolution process may be facilitated by treating the partially resolved alkanolamine derivative in free base form obtained after a single fractional crystallisation of the diastereoisomeric mixture of salts with a solubilising agent, for example a primary amine, for example allylamine, in a relatively non-polar diluent or solvent, for example petroleum ether.

The alkanolamine derivative of the invention in free base form may be converted into an acid-addition salt thereof by reaction with an acid by conventional means.

As stated above, the alkanolamine derivative of the invention or an acid-addition salt thereof possesses cardio-selective β-adrenergic blocking activity. The β-adrenergic blocking activity may be determined by reversal of isoprenaline-induced tachycardia in rats or cats, a standard test for the determination of β-adrenergic blocking activity, and the cardiac selectivity may be demonstrated by relative freedom from antagonism of isoprenaline-induced vasodilatation in cats or of the relief produced by isoprenaline of histamine-induced bronchospasm in guinea pigs. Compounds exhibiting this selective action show a greater degree of specificity in blocking the cardiac β-receptors than the β-receptors in peripheral blood vessels and bronchial muscle. Thus, a dose may be selected for such a compound at which the compound blocks the cardiac chronotropic action of a catecholamine [for example isoprenaline, that is, 1-(3,4-dihydroxyphenyl)-2-isopropylaminoethanol] but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other obstructive airways diseases, inasmuch as the selective compound will substantially inhibit the unwanted stimulatory effects of the bronchodilator on the heart but will not hinder the desirable therapeutic effect of the bronchodilator.

The advantage of an alkanolamine derivative of the present invention over the most closely related compound described in United Kingdom No. 1,231,783 is exemplified in the following table. The 50%-effective cardiac β-adrenergic blocking dose (the $ED_{50}$) is defined as that amount of alkanolamine derivative, in μg./kg., which when administered to a chloralose-anaesthetised cat during 30 minutes lowers by 50% the tachycardia induced in the cat by a single dose of 0.2 μg./kg. of isoprenaline. The non-cardiac β-adrenergic blocking effect is demonstrated by the effect on the isoprenaline-induced fall in blood pressure of the cat at the $ED_{50}$, and this is defined as the $BP_{50}$. A negative or small positive $BP_{50}$ figure indicates cardio-selectivity; a $BP_{50}$ figure of 50 indicates non-cardio-selectivity, that is, the alkanolamine derivative is equally effective in blocking the effect of isoprenaline on the cardiac and peripheral β-receptors.

Compounds 1 to 3 have the general formula:

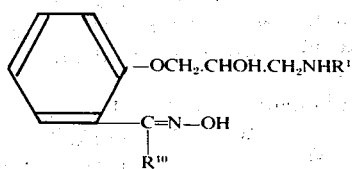

compounds 1 and 2 being alkanolamine derivatives of the present invention and Compound 3 being a compound described in United Kingdom No. 1,231,783. Compounds 4 and 5 are respectively practolol, a commercially-available cardio-selective β-adrenergic blocking agent, and propranolol, a commercially-available non-cardio-selective β-adrenergic blocking agent. These compounds are included solely for purposes of comparison and to show the state of the art.

| Compound No. | R¹ | R¹⁰ | ED₅₀ | BP₅₀ |
|---|---|---|---|---|
| 1 | isopropyl | H | 25 | −50 |
| 2 | t-butyl | H | 19 | +1 |
| 3 | isopropyl | methyl | 177 | +37 |
| 4 | practolol | | 167 | +8 |
| 5 | propranolol | | 62 | +85 |

At doses of an alkanolamine derivative of the invention which produce effective β-adrenergic blockade in rats or cats, no symptoms of toxicity are apparent.

The alkanolamine derivative of the invention may be administered to warm-blooded animals, including man, in the form of a pharmaceutical composition comprising as active ingredient at least one alkanolamine derivative of the invention, or an acid-addition salt thereof, in association with a pharmaceutically-acceptable diluent or carrier therefor.

A suitable composition is, for example, a tablet, capsule, aqueous or oily solution or suspension, emulsion, injectable aqueous or oily solution or suspension, dispersible powder, spray or aerosol formulation.

The pharmaceutical composition may contain, in addition to the alkanolamine derivative of the invention, one or more drugs selected from sedatives, for example phenobarbitone, meprobamate, chlorpromazine and the benzodiazepine sedative drugs, for example chlordiazepoxide and diazepam; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; agents used in the treatment of Parkinson's disease, for example benzhexol; cariotonic agents, for example digitalis preparations; and sympathomimetic bronchodilators, for example isoprenaline, orciprenaline, adrenaline and ephedrine.

When used for the treatment of heart diseases, for example angina pectoris and cardiac arrhythmias, or for the treatment of hypertension, in man it is expected that the alkanolamine derivative would be given to man at a total oral dose of between 20 mg. and 600 mg. daily, at doses spaced at 6–8 hourly intervals, or at an intravenous dose of between 1 mg. and 20 mg. Preferred oral dosage forms are tablets or capsules containing between 10 and 100 mg., and preferably 10 mg. or 40 mg. of active ingredient. Preferred intravenous dosage forms are sterile aqueous solutions of the alkanolamine derivative or of a non-toxic acid-addition salt thereof, containing between 0.05% and 1% w/v of active ingredient, and more particularly containing 0.1% w/v of active ingredient.

The invention is illustrated but not limited by the following Examples:

EXAMPLE 1

A solution of hydroxylamine hydrochloride (0.695 g.) in water (5 ml.) is added to a solution of 1-o-formylphenoxy-3-isopropylamino-2-propanol (2.37 g.) in ethanol (10 ml.) and aqueous 2N-sodium hydroxide solution is added until the pH of the mixture is 10. The mixture is heated under reflux for 2.5 hours and then poured into water, and the resulting mixture is extracted with methylene chloride (3 × 100 ml.). The extract is dried and evaporated to dryness, the residue is dissolved in ethyl acetate and a solution of oxalic acid in ethyl acetate is added. The mixture is filtered and there is thus obtained o-(2-hydroxy-3-isopropylaminopropoxy)-benzaldehyde oxime oxalate, m.p. 135°C.

EXAMPLE 2

The process described in Example 1 is repeated except that 1-o-formylphenoxy-3-t-butylamino-2-propanol is used as starting material in place of the corresponding isopropylamino compound, and that the final product in free-base form is converted to the hydrochloride thereof in place of the oxalate. There is thus obtained o-(2-hydroxy-3-t-butylaminopropoxy)-benzaldehyde oxime hydrochloride, m.p. 186°–187°C. after crystallisation from isopropyl alcohol.

What I claim is:

1. An alkanolamine derivative selected from compounds of the formula:

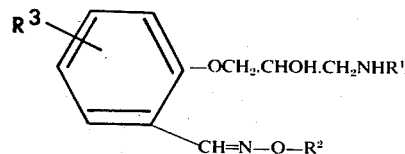

wherein R¹ is alkyl or hydroxyalkyl, each of 3 or 4 carbon atoms which is branched at the α-carbon atom, or cycloalkyl of up to 6 carbon atoms, wherein R² is hydrogen or alkyl of up to 6 carbon atoms and wherein R³ is hydrogen or halogen, and the salts thereof or pharmaceutically acceptable acids.

2. An alkanolamine derivative as claimed in claim 1 selected from compounds of the formula given in claim 1 wherein R¹ is isopropyl, s-butyl, t-butyl, 2-hydroxy-1-methylethyl, 2-hydroxy-1,1-dimethylethyl, cyclopropyl, cyclobutyl, cyclopentyl or cyclohexyl, wherein R² is hydrogen, methyl, ethyl or n-propyl, and wherein R³ is hydrogen, fluorine, chlorine, bromine or iodine, and the acid-addition salts thereof.

3. The compound claimed in claim 1 which is o-(2-hydroxy-3-isopropylaminopropoxy)benzaldehyde oxime or an acid-addition salt thereof.

4. The compound claimed in claim 1 which is o-(2-hydroxy-3-t-butylaminopropoxy)benzaldehyde oxime or an acid-addition salt thereof.

5. An acid-addition salt as claimed in claim 1 which is a hydrochloride, hydrobromide, phosphate, sulphate, oxalate, lactate, tartrate, acetate, salicylate, citrate, benzoate, β-naphthoate, adipate or 1,1-methylene-bis-(2-hydroxy-3-naphthoate).

* * * * *